(12) United States Patent
Cornwall et al.

(10) Patent No.: US 8,436,744 B2
(45) Date of Patent: May 7, 2013

(54) PRIORITIZED COLLECTION OF METER READINGS

(75) Inventors: Mark Cornwall, Spokane, WA (US); Matthew Johnson, Spokane, WA (US)

(73) Assignee: Itron, Inc., Liberty Lake, WA (US)

( * ) Notice: Subject to any disclaimer, the term of this patent is extended or adjusted under 35 U.S.C. 154(b) by 1040 days.

(21) Appl. No.: 12/362,447

(22) Filed: Jan. 29, 2009

(65) Prior Publication Data

US 2010/0188263 A1 Jul. 29, 2010

(51) Int. Cl.
G08B 23/00 (2006.01)
G08C 15/06 (2006.01)

(52) U.S. Cl.
USPC ............................................ 340/870.02

(58) Field of Classification Search ............ 340/870.02, 340/870.03
See application file for complete search history.

(56) References Cited

U.S. PATENT DOCUMENTS

| | | |
|---|---|---|
| 4,352,164 A | 9/1982 | Reed et al. |
| 4,504,831 A | 3/1985 | Jahr et al. |
| 4,525,669 A | 6/1985 | Holberton et al. |
| 4,757,456 A | 7/1988 | Benghiat |
| 4,799,059 A | 1/1989 | Grindahl et al. |
| 4,988,972 A | 1/1991 | Takagi |
| 5,194,860 A | 3/1993 | Jones et al. |
| 5,270,704 A | 12/1993 | Sosa Quintana et al. |
| 5,278,551 A | 1/1994 | Wakatsuki et al. |
| 5,438,329 A | 8/1995 | Gastouniotis et al. |
| 5,448,747 A | 9/1995 | Garverick et al. |
| 5,473,322 A | 12/1995 | Carney |
| 5,553,094 A | 9/1996 | Johnson et al. |
| 5,606,913 A | 3/1997 | Kowalewski |
| 5,617,084 A | 4/1997 | Sears |
| 5,874,903 A | 2/1999 | Shuey et al. |
| 5,897,607 A | 4/1999 | Jenney et al. |
| 5,898,384 A | 4/1999 | Alt et al. |
| 5,914,673 A | 6/1999 | Jennings et al. |
| 6,006,212 A | 12/1999 | Schleich et al. |

(Continued)

FOREIGN PATENT DOCUMENTS

| | | |
|---|---|---|
| EP | 1265450 A2 | 12/2002 |
| GB | 2356475 | 5/2001 |
| WO | WO 01/35366 | 5/2001 |

OTHER PUBLICATIONS

Mobile Collector 2.0 User's Guide, Itron, inc., Spokane, WA, 2003, pp. i-84.

(Continued)

Primary Examiner — Rexford Barnie
Assistant Examiner — Christopher Clark
(74) Attorney, Agent, or Firm — Dority & Manning, P.A.

(57) ABSTRACT

Generally described, the disclosed subject matter is directed to improving the collection of GDT meter readings. In accordance with one embodiment, a method is provided for prioritizing the transmission and process of GDT meter readings in an AMR system. In particular, the method includes capturing a GDT meter reading that quantifies the consumption of a utility service at a utility meter. Then, during a reporting window, one or more packets of the GDT meter reading having a data item that identifies the enhanced priority level of the data is transmitted from the utility meter. When a collector receives the transmission, the elevated priority allocated to the transmission is identified. As a result, the collector causes the GDT meter reading to be forwarded to a host computer prior to the processing and transmission of other meter readings.

20 Claims, 7 Drawing Sheets

U.S. PATENT DOCUMENTS

| | | | |
|---|---|---|---|
| 6,014,089 A | 1/2000 | Tracy et al. | |
| 6,067,029 A | 5/2000 | Durston | |
| 6,088,659 A | 7/2000 | Kelley et al. | |
| 6,100,817 A | 8/2000 | Mason et al. | |
| 6,163,276 A | 12/2000 | Irving et al. | |
| 6,181,258 B1 | 1/2001 | Summers et al. | |
| 6,188,715 B1 * | 2/2001 | Partyka | 375/134 |
| 6,195,018 B1 | 2/2001 | Ragle et al. | |
| 6,219,655 B1 | 4/2001 | Schleich et al. | |
| 6,229,451 B1 | 5/2001 | Brown | |
| 6,232,886 B1 | 5/2001 | Morand | |
| 6,239,589 B1 | 5/2001 | Windsheimer | |
| 6,246,677 B1 | 6/2001 | Nap et al. | |
| 6,249,516 B1 | 6/2001 | Brownrigg et al. | |
| 6,256,128 B1 | 7/2001 | Lavoie et al. | |
| 6,259,972 B1 | 7/2001 | Sumic et al. | |
| 6,300,881 B1 | 10/2001 | Yee et al. | |
| 6,363,057 B1 | 3/2002 | Ardalan et al. | |
| 6,374,188 B1 | 4/2002 | Hubbard et al. | |
| 6,393,341 B1 | 5/2002 | Lawrence et al. | |
| 6,396,839 B1 | 5/2002 | Ardalan et al. | |
| 6,452,490 B1 | 9/2002 | Garland et al. | |
| 6,452,986 B1 | 9/2002 | Luxford et al. | |
| 6,477,558 B1 | 11/2002 | Irving et al. | |
| 6,512,463 B1 | 1/2003 | Campbell et al. | |
| 6,628,207 B1 | 9/2003 | Hemminger et al. | |
| 6,657,549 B1 | 12/2003 | Avery et al. | |
| 6,657,552 B2 | 12/2003 | Belski et al. | |
| 6,677,862 B1 | 1/2004 | Houlihane et al. | |
| 6,700,902 B1 | 3/2004 | Meyer et al. | |
| 6,748,475 B1 | 6/2004 | Sorensen | |
| 6,778,099 B1 | 8/2004 | Meyer et al. | |
| 6,798,353 B2 | 9/2004 | Seal et al. | |
| 6,836,737 B2 * | 12/2004 | Petite et al. | 702/62 |
| 6,868,293 B1 | 3/2005 | Schurr | |
| 6,885,309 B1 | 4/2005 | Van Heteren | |
| 6,888,876 B1 | 5/2005 | Mason, Jr. et al. | |
| 6,940,868 B1 | 9/2005 | Barbour et al. | |
| 6,963,285 B2 | 11/2005 | Fischer et al. | |
| 6,996,215 B2 | 2/2006 | MacConnell | |
| 7,012,546 B1 | 3/2006 | Zigdon et al. | |
| 7,109,882 B2 | 9/2006 | Angelis et al. | |
| 7,283,062 B2 | 10/2007 | Hoiness et al. | |
| 7,346,030 B2 | 3/2008 | Cornwall | |
| 7,362,236 B2 | 4/2008 | Hoiness | |
| 7,400,264 B2 | 7/2008 | Boaz | |
| 7,830,874 B2 | 11/2010 | Cornwall et al. | |
| 2002/0063635 A1 | 5/2002 | Shincovich | |
| 2002/0071478 A1 | 6/2002 | Cornwall et al. | |
| 2002/0109607 A1 | 8/2002 | Cumeralto et al. | |
| 2002/0188702 A1 | 12/2002 | Short et al. | |
| 2003/0040844 A1 | 2/2003 | Spool et al. | |
| 2003/0063723 A1 | 4/2003 | Booth et al. | |
| 2003/0204756 A1 | 10/2003 | Ransom et al. | |
| 2003/0235194 A1 | 12/2003 | Morrison | |
| 2004/0019518 A1 | 1/2004 | Abraham et al. | |
| 2004/0021568 A1 | 2/2004 | Seal et al. | |
| 2004/0030745 A1 | 2/2004 | Boucher et al. | |
| 2004/0093209 A1 | 5/2004 | Okutani | |
| 2004/0125889 A1 | 7/2004 | Cumeralto et al. | |
| 2004/0236620 A1 | 11/2004 | Chauhan et al. | |
| 2005/0017848 A1 | 1/2005 | Flen et al. | |
| 2005/0023347 A1 | 2/2005 | Wetzel et al. | |
| 2005/0068193 A1 | 3/2005 | Osterloh et al. | |
| 2005/0119930 A1 | 6/2005 | Simon | |
| 2005/0192999 A1 | 9/2005 | Cook et al. | |
| 2005/0222933 A1 | 10/2005 | Wesby | |
| 2005/0239414 A1 | 10/2005 | Mason et al. | |
| 2005/0267898 A1 | 12/2005 | Simon et al. | |
| 2007/0043849 A1 | 2/2007 | Lill | |
| 2007/0211768 A1 * | 9/2007 | Cornwall et al. | 370/509 |
| 2008/0040025 A1 | 2/2008 | Hoiness | |
| 2008/0048883 A1 | 2/2008 | Boaz | |
| 2009/0102681 A1 * | 4/2009 | Brennan et al. | 340/870.03 |

OTHER PUBLICATIONS

Mobile Collector 2.0 Administration Guide, Itron, Inc., Spokane, WA, 2003, pp. i-78.

BadgerMeter, Inc., "TRACE® Automated Meter Reading System, Vehicle Interactive Display (VID), Technical Brief," Milwaukee, WI, Jun. 2002, 1 page.

BadgerMeter, Inc., "TRACE® automated Meter Reading System, Operation Brief," Milwaukee, WI, Dec. 2001, 2 pages.

BadgerMeter, Inc., "TRACE® Automated Meter Reading System, MODEL MMi Mini Mobile Interrogator, Technical Brief," Milwaukee, WI, Dec. 2001, 2 pages.

AMCO Automated Systems, LLC, "Vehicular Interactive Display (a Mini Mobile Interrogator option)," Scott Depot, WV, Sep. 2002, 2 pages.

AMCO Automated Systems, LLC, "TRACE Automated Meter Reading Systems, TRACE™—mobile AMR system," Scott Depot, WV, Apr. 2003, 2 pages.

"Magellan RoadMate 700 (North America)," Thales Navigation, Inc., 2004 http://www.magellangps.com/en/products/product.asp?PRODID=955, 3 pages, Internet access on Oct. 27, 2004.

LookSmart's FindArticles, "BC Gas Selects Utility Partners' MobileUP Solution for Workforce Automation," Business Wire, Jun. 19, 2000, pp. 1-2, http://www.findarticles.com/p/articles/mi_m0EIN/is_2000_June_19/ai_62815236/print, [Accessed Oct. 21, 2004].

DB Microware, "DB Microware Wins 2004 iAnywhere Innovator Award," DB Microware Fieldnet Family, 2001, pp. 1-2, http://www.dbmicro.com/Fieldnet.htm [Accessed Oct. 21, 2004].

International Search Report dated Apr. 5, 2001 for PCT International Application No. PCT/US2000/041568, 2 pages.

International Search Report dated Jun. 3, 2004 for PCT International Application No. PCT/US2003/027739.

GlobalSecurity.org, "Electrical Distribution System Overview", http://www.globalsecurity.org/security/intro/power.htm, 6 pages.

* cited by examiner

| Byte | Value | Description |
| --- | --- | --- |
| 0 | xxxxxxxx | 0x16 Frame Sync 1 |
| 1 | xxxxxxxx | 0xA3 Frame Sync 2 |
| 2 | xxxxxxxx | 0x20 Protocol ID |
| 3 | xxxxxxxx | ERT ID MSB |
| 4 | xxxxxxxx | ERT ID |
| 5 | xxxxxxxx | ERT ID |
| 6 | xxxxxxxx | ERT ID LSB |
| 7 | xxxxxxxx | GDT Reading MSB |
| 8 | xxxxxxxx | GDT Reading |
| 9 | xxxxxxxx | GDT Reading |
| 10 | xxxxxxxx | GDT Reading LSB |
| 11 | xxxxxxxx | Endpoint Time MSB |
| 12 | xxxxxxxx | Endpoint Time LSB |
| 13 | xxxxxxxx | Network Configuration Byte #1 |
| 14 | xxxxxxxx | Network Configuration Byte #2 |
| 15 | xxxxxxxx | 32-Bit CRC MSB (Bytes 2 -14) |
| 16 | xxxxxxxx | 32-Bit CRC |
| 17 | xxxxxxxx | 32-Bit CRC |
| 18 | xxxxxxxx | 32-Bit CRC LSB |

*Fig.5B.*

PRIORITIZED COLLECTION OF METER READINGS

BACKGROUND

Utility meters configured with devices for automated transmission of meter readings are increasingly being installed in homes, businesses, and the like. Over the last few years, there has been a concerted effort to automate meter reading by installing fixed networks and implementing mobile units that allow data to flow from the meter to a host computer system without human intervention. These systems are referred to in the art as Automated Meter Reading (AMR) systems. An AMR system typically consists of three basic components: an Encoder-Receiver-Transmitter (ERT); a Data Collection Unit (DCU); and an AMR computing system. The ERT is a meter interface device attached to the meter, which either periodically transmits utility consumption data ("bubble-up" ERTs) or receives a "wake up" polling signal containing a request for their meter information from the DCU (e.g., a fixed transceiver unit, a transceiver mounted in a passing vehicle, a handheld unit, etc.). The ERT, periodically or in response to a wake-up signal, broadcasts the meter number, the meter reading, and other information to the DCU. The DCU collects the information from the ERTs for subsequent retransmission to the AMR computing system. The AMR computing system receives the newly collected meter readings and updates the appropriate accounts of the billing system.

The delivery of utility services may be a matter of negotiated contracts that are applied at regular intervals. In this regard, Gas Day Take (GDT) is a term in the art that describes a particular type of relationship that utilizes periodic readings of utility services, particularly for gas transport customers. In this regard, GDT data is typically obtained daily at a specific time of day, (i.e., 9:00 A.M. CST), and made accessible to customers before a GDT deadline (i.e., 11:00 A.M. CST).

For communication over a network, transmissions of meter readings are typically encoded as "packetized" data. However, since a dedicated channel is not allocated when transmitting packets containing GDT readings, the latency of transmissions and packet success rate may depend on the efficiency of shared resources. In other words, GDT readings may compete with other metering communications for limited network resources. In instances of heavy network traffic or other adverse network conditions, this may result in unacceptable delay and/or packet loss in GDT transmissions. Unfortunately, existing AMR systems do not provide a configurable and fault-tolerant way of allocating priority to GDT readings.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Generally described, the disclosed subject matter is directed to improving the collection of GDT meter readings. In accordance with one embodiment, a method is provided for prioritizing the transmission and processing of GDT meter readings in an AMR system. In accordance with this embodiment, the method includes capturing a GDT meter reading that quantifies the consumption of a utility service at a utility meter. Then, during a reporting window, one or more packets of the GDT meter reading having a data item that identifies the enhanced priority of the data is transmitted from the utility meter. When a collector receives the transmission, the elevated priority allocated to the transmission is identified. As a result, the collector causes the GDT meter reading to be forwarded to a host computer prior to the processing and transmission of other meter readings.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 5B is a block diagram illustrating a packet format suitable for illustrating aspects of the disclosed subject matter.

DETAILED DESCRIPTION

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. In this regard, the following description first provides a general description of a meter reading system in which the disclosed subject matter may be implemented. Then, exemplary routines for collecting GDT meter readings will be described. The illustrative examples provided herein are not intended to be exhaustive or to limit the invention to the precise forms disclosed. Similarly, any steps described herein may be interchangeable with other steps, or combinations of steps, in order to achieve the same or substantially similar result.

Although not required, several aspects of the present disclosure are described in the general context of computer-executable instructions, such as routines executed by a general-purpose computer (e.g., a server computer, wireless device, or personal/laptop computer). Those skilled in the relevant art will appreciate that aspects of the present disclosure can be practiced with other communications, data processing, or computer system configurations, including Internet appliances, hand-held devices (including personal digital assistants (PDAs)), wearable computers, cellular or mobile phones, embedded computers (including those coupled to vehicles), programmable consumer electronics, set-top boxes, network PCs, mini-computers, mainframe computers, and the like. Moreover, while the description provided herein is made in reference to collecting GDT readings, meter data may be collected on a different periodic intervals (weekly, monthly, etc.) or on a programmed basis. In addition, those skilled in the art and others will recognize the same or substantially similar concepts discussed herein with relation to Gas Day Take may be applied to other utility services.

Several aspects of the present disclosure can be embodied in a special purpose computer or data processor that is specifically programmed, configured, or constructed to perform one or more of the computer-executable instructions explained in detail herein. Several aspects of the present disclosure can also be practiced in distributed computing environments where tasks or modules are performed by remote processing devices, which may be linked through a communication network. In a distributed computing environment, program modules may be located in both local and remote memory storage devices.

Figure 1:
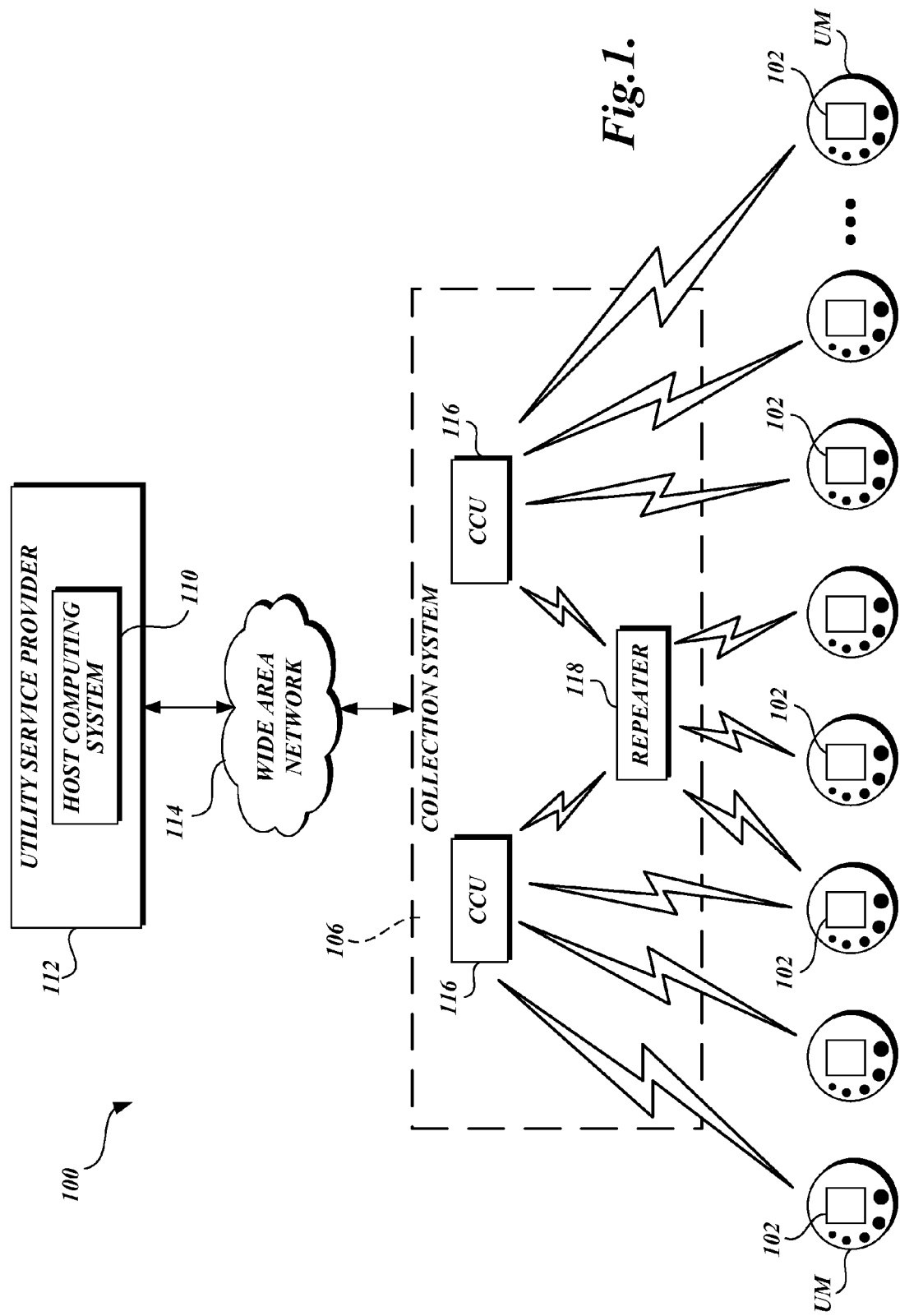
FIG. 1 is a block diagram depicting an illustrative metering environment suitable for collecting data from utility meters.

Referring now to FIG. 1, the following is intended to provide a general description of one embodiment of a communications system, such as a meter reading system 100, in which aspects of the present disclosure may be implemented. In one embodiment, the meter reading system 100 may be an automated meter reading (AMR) system that reads and monitors utility meters remotely, typically using a collection system comprised of fixed collection units, mobile collection units, etc.

Generally described, the meter reading system 100 depicted in FIG. 1 includes a plurality of endpoint devices 102, a collection system 106, and a host computing system 110. The endpoint devices 102 are associated with, for example, utility meters UM (e.g., gas meters, water meters, electric meters, etc.), for obtaining data, such as meter data (e.g., consumption data, tampering data, etc.) therefrom. The endpoint devices 102 in the meter reading system 100 may be a wired or wireless communications device capable of performing two way communications with the collection system 106 utilizing automated meter reading protocols. For example, the endpoint devices 102 are capable of receiving data (e.g., messages, commands, etc.) from the collection system 106 and transmitting meter data such as GDT readings to the collection system 106. Depending on the exact configuration and types of devices used, the endpoint devices 102 transmit meter and/or other data either periodically ("bubble-up"), in response to a wake-up signal, or in a combination/hybrid configuration. In each instance, the endpoint devices 102 are configured to exchange data with the collection system 106.

Still referring to FIG. 1, the collection system 106 of the meter reading system 100 collects meter reading data and other data from the plurality of endpoint devices 102, processes the data, and forwards the data to the host computing system 110 of the utility service provider 112. The collection system 106 may employ any number of automated meter reading protocols and devices to communicate with the endpoint devices 102. In the embodiment shown, the collection system 106, for example, may include a fixed network comprised of one or more Cell Control Units 116 ("CCU 116") that collect radio-based meter readings within a particular geographic area either directly from the endpoint devices 102, or indirectly via one or more optional repeaters 118. While the collection system 106 is illustrated as using the CCU 116 to collect GDT readings, other collectors may be used without departing from the scope of the claimed subject matter.

In the embodiment depicted in FIG. 1, the collection system 106 is configured to forward meter readings to the host computing system 110 of the utility service provider 112 over a wide area network 114, which may be implemented utilizing TCP/IP Protocols (e.g., Internet), GPRS or other cellular-based protocols, Ethernet, WiFi, Broadband Over Power Line, and combinations thereof, etc. In one aspect, the collection system 106 serves as the bridge for transmitting data between devices that utilize automated meter reading protocols (e.g., the endpoint devices 102) with computers (e.g., the host computing system 110) coupled to the wide area network 114. The host computing system 110 includes application logic for reading, processing, and managing the collection of meter data, including GDT readings.

The discussion provided above with reference to FIG. 1 is intended as a brief, general description of one meter reading system 100 capable of implementing various features of the present disclosure. While the description above is made with reference to particular devices linked together through different interfaces, those skilled in the art will appreciate that the claimed subject matter may be implemented in other contexts. In this regard, the claimed subject matter may be practiced using different types of devices and communication interfaces than those illustrated in FIG. 1.

Figure 2:
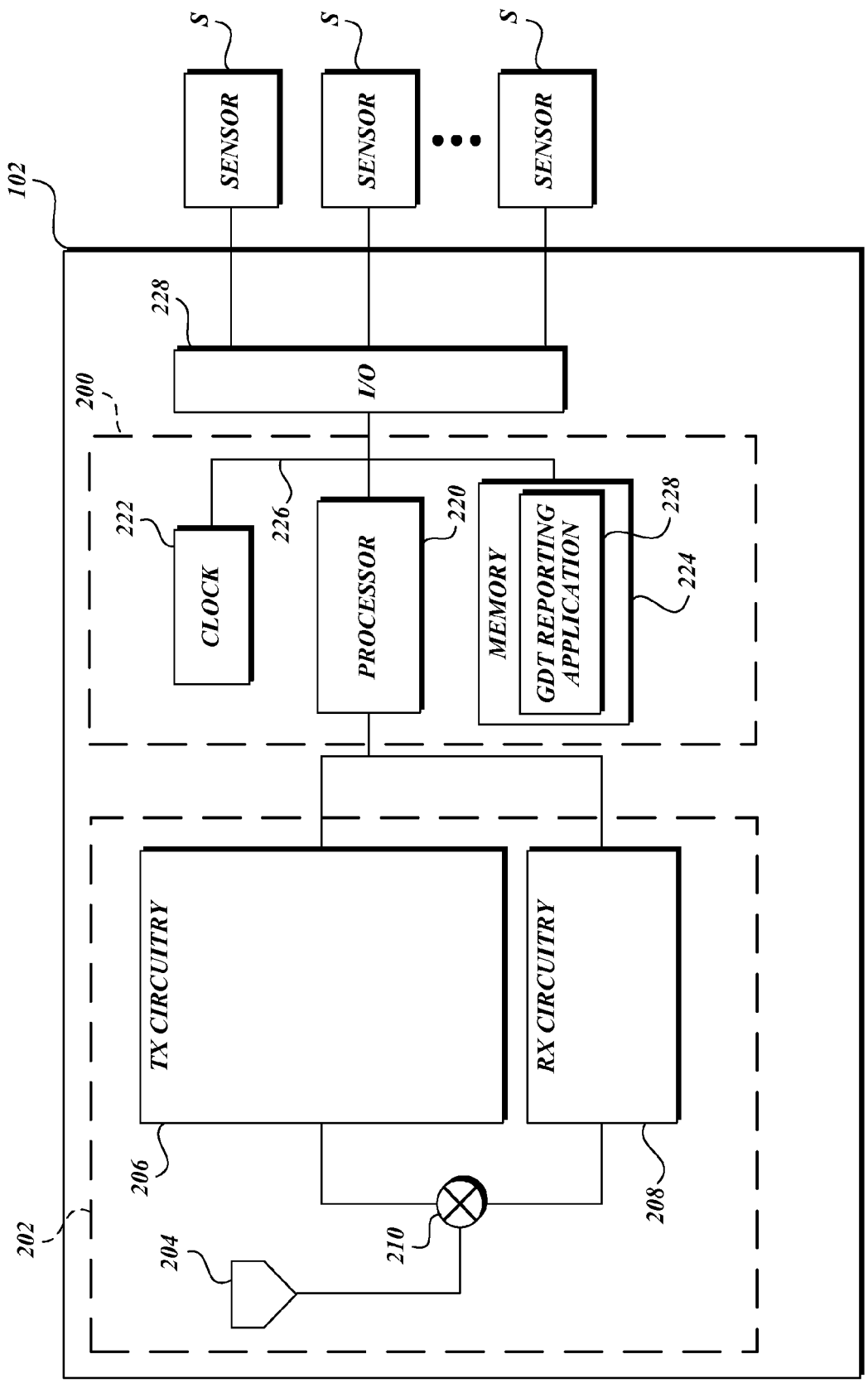
FIG. 2 is a block diagram illustrating components of one embodiment of an endpoint device such as a utility meter.

Turning now to FIG. 2, there is shown one example architecture of an endpoint device 102 for use in the system 100. Each endpoint device 102 continuously gathers and stores meter data from associated sensors of the utility meters, for reporting to the utility providers, end users, etc. The endpoint device 102 retrieves the stored data, formats and/or encodes the data according to one or more protocols and transmits this encoded data with other information via radio frequency (RF) communication links to the repeaters 118 and/or the CCUs 116. The endpoint devices 102 are also capable of receiving data from the repeaters 118, the CCUs 116, or other communications devices.

For carrying out the functionality described herein, each endpoint device 102 comprises a main computing device 200 communicatively coupled to a communications device 202. In the example depicted in FIG. 2, the communications device 202 is a radio-based transceiver, transmitter-receiver, or the like, that may include a communications antenna 204, transmit (TX) circuitry 206 and receive (RX) circuitry 208, and an antenna multiplexer 210 that switches between the transmit (TX) circuitry 206 and the receive (RX) circuitry 208 depending on the mode of operation. The communications device may be configured to transmit RF-based communications signals according to any suitable modulation protocols, such as DSSS, FHSS, FM, AM, etc. In one embodiment, the transmit circuitry and/or receive circuitry may be implemented as an RF integrated circuit (RFIC) chip, and may comprise various components including, for example, mixers, a voltage controlled oscillator (VCO), a frequency synthesizer, automatic gain control (AGC), passive and/or active filters, such as harmonic filters, dielectric filters, SAW filters, etc, A/D and/or D/A converters, modulators/demodulators, PLLs, upconverters/downconverters, and/or other analog or digital components that process baseband signals, RF signals, or IF band signals, etc.

As briefly discussed above, the transmission/reception of the RF-based communications signals by the endpoint devices 102 is carried out under control of the main computing device 200. In the example depicted in FIG. 2, the main computing device 200 may include a processor 220, a timing clock 222, and a memory 224, connected by a communication bus 266. As further depicted in FIG. 2, the main computing device 200 may also include an I/O interface 228 for interfacing with, for example, one or more sensors S associated with a utility meter. The one or more sensors S may be any known sensor for obtaining consumption data, tampering data, etc. The data obtained from the sensors S is processed by the processor 220 and then stored in the memory 224.

The memory 224 depicted in FIG. 2 is one example of computer-readable media suited to store data and program modules for implementing aspects of the claimed subject matter. As used herein, the term "computer-readable media" includes volatile and non-volatile and removable and non-removable memory implemented in any method or technology capable of storing information, such as computer-readable instructions, data structures, program modules, or other data. In this regard, the memory 224 depicted in FIG. 2 is one example of computer-readable media but other types of computer-readable media may be used. Those skilled in the art and others will recognize that the processor 220 serves as the computational center of the endpoint device 102 by supporting the execution of instructions that are available from the memory 224.

The processor 220 has the responsibilities within the endpoint device 102 of overall system timing and supervision including accumulating sensor data, responding to commands, and formatting data for network transmission. Logic provided by the disclosed subject matter and executed by the processor 220 effectuates the encoding and prioritized transmissions of GDT readings. In one embodiment, GDT readings are encoded as Bubble-Up Packets ("BUP") at the endpoint device 102 described in further detail below with reference to FIG. 5B. However, it will be appreciated that the endpoint device 102 may support other packet formats and message types without departing from the scope of the claimed subject matter.

As described in FIG. 2, the memory 224 includes a GDT reporting application 228 that provides a fault-tolerant and configurable way of reporting GDT readings from the endpoint device 102. Generally described, the success rate for collecting meter data is affected by multiple factors, including but not limited to traffic load, interference sources, stability of service, etc. In one embodiment, the GDT reporting application 228 causes packets that contain GDT readings to be transmitted at an elevated rate during a GDT reporting window. For example, typical meter readings may be transmitted every fifteen (15) minutes whereas the rate of GDT transmissions may occur every fifteen (15) seconds, within the reporting window. The endpoint device 102 is configurable with regard to the reporting initiation time, rate of GDT packet transmission, length of reporting window, etc. In instances when the success rate for collecting GDT readings is below expectations, the GDT reporting application 228 allows the endpoint device 102 to be reprogrammed. Accordingly, an optimal configuration can be established to achieve the desired reliability and latency in reporting GDT readings. Moreover, the GDT reporting initiation time is programmable and may be re-configured in the endpoint device 102. The exact configuration selected may depend on network and device variables that make a particular configuration preferable over another. However, any number of configurations are possible since the endpoint device 102 is capable of being reprogrammed based on received commands.

Now with reference to FIG. 3, one example component architecture for a CCU 116 depicted in FIG. 1 will be described. Generally described, the CCU 116 includes a processor 300, a memory 302, and a clock 304 interconnected via one or more buses 306. In addition, the CCU 116 includes a network interface 308 comprising components for communicating with other devices over the wide area network 114 (FIG. 1), utilizing any appropriate protocol, such as TCP/IP Protocols (e.g., Internet), GPRS or other cellular-based protocols, Ethernet, WiFi, Broadband Over Power Line, and combinations thereof, etc. As further depicted in FIG. 3, the CCU 116 includes a radio-based communication device 310 for transmitting/receiving wireless communications with other radio-based devices (e.g., the endpoint devices 102, repeaters 118, etc.).

Figure 3:
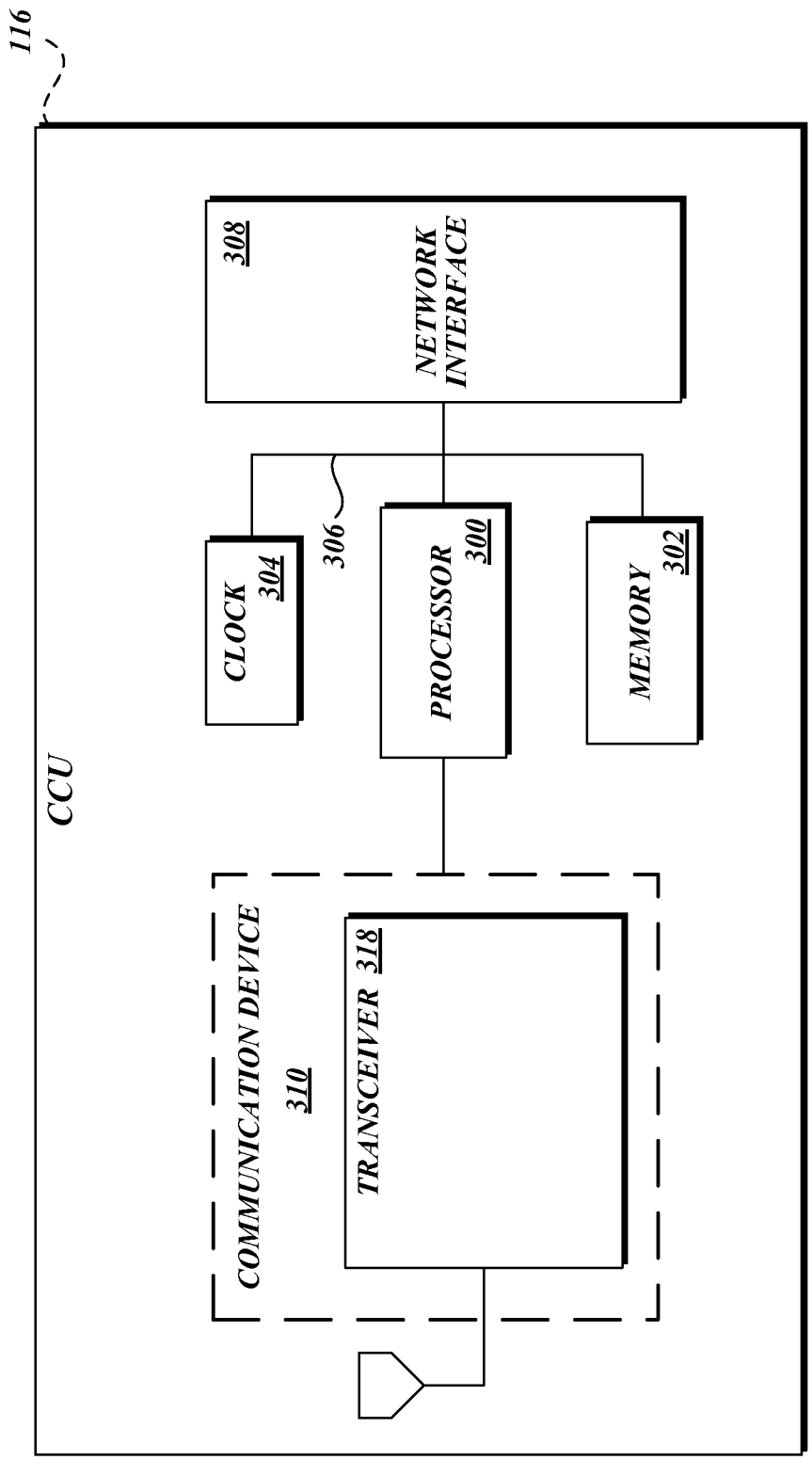
FIG. 3 is a block diagram illustrating components of one embodiment of a collector, such as a Cell Control Unit (CCU)

In the embodiment shown in FIG. 3, the communication device 310 includes at least one transceiver, transmitter-receiver, or the like, generally designated 318, of half-duplex (transmit or receive but not both simultaneously) or full-duplex design (transmit and receive simultaneously) that is capable of identifying, locating, and storing meter readings from one or more utility meters. Typical meter readings are stored in the CCU 116 and uploaded to the host computing system 110 on a periodic schedule (e.g., hourly). In an actual embodiment, logic suitable to be executed by the processor 300 performs processing to determine whether received transmissions include a GDT reading. When received, the GDT reading is identified as having an elevated status relative to other meter readings. In one embodiment, the GDT reading is forwarded to the host computing system 110 immediately once the processing performed by the CCU 116 is complete. Alternatively, GDT readings may be clustered in relatively small data sets for storage on the CCU and forwarded to the host computing system 110 at short intervals. GDT readings are allocated priority relative to other meter readings, thereby minimizing transmission latency and decreasing the potential for packet loss.

Still referring to FIG. 3, the processor 300 processes the incoming GDT readings, among other data, and stores such data in the memory 302. The processed GDT readings may be parsed and re-packaged into a structured format suitable for transmission over the wide area network 114. In this regard, GDT readings from a plurality of endpoint devices 102 may be aggregated in a data store maintained at the host computing system 110. Other data collected at the CCU 116, such as noise/interference data, read efficiency data, or other data indicative of packet transmission rates and latency may also be forwarded to the host computing system 110 for further processing.

Figure 4:
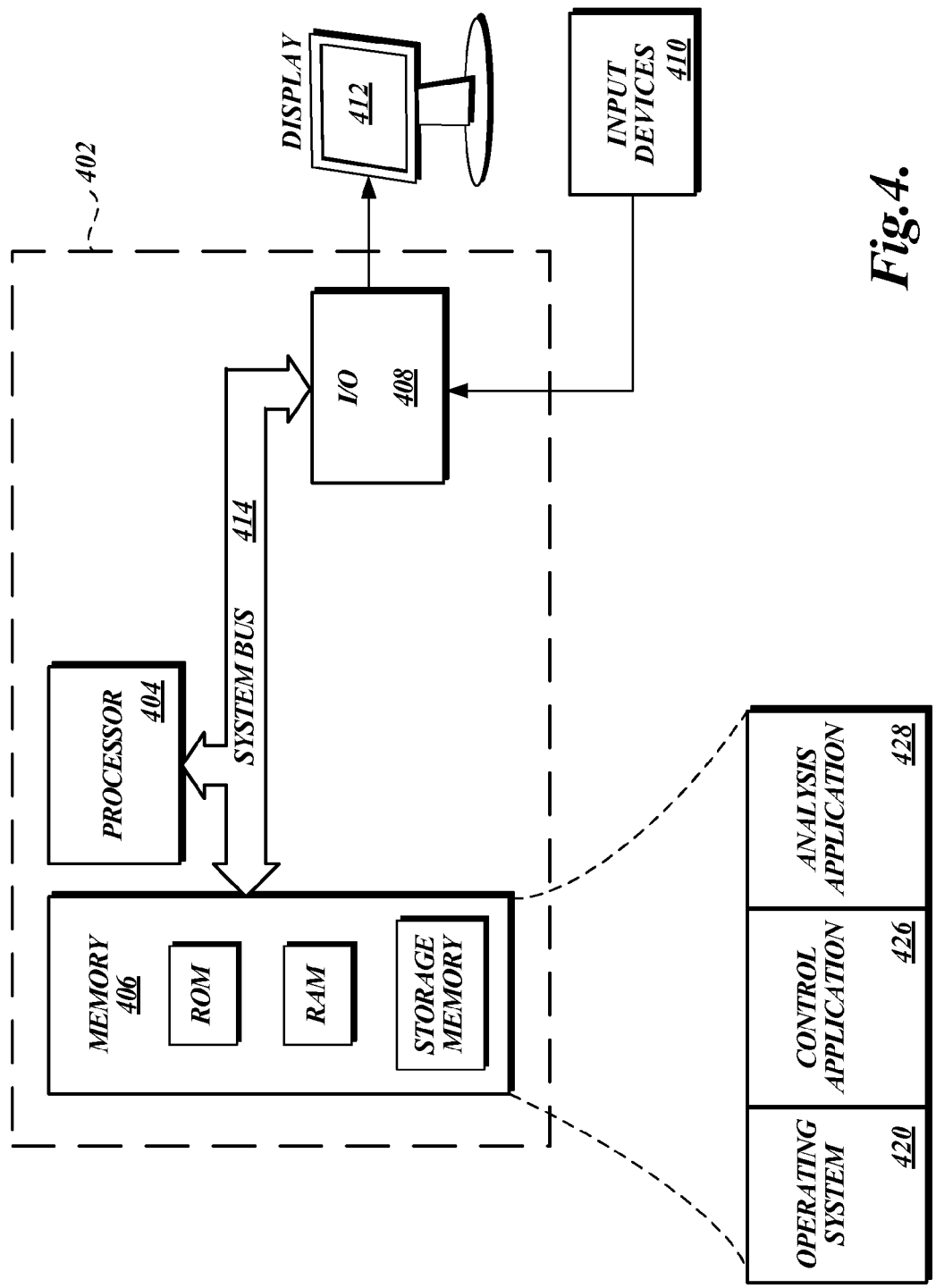
FIG. 4 is a block diagram illustrating components of one embodiment of a host computing device.

As stated above, GDT readings obtained by the collection system 106 are forwarded to the host computing system 110. One embodiment of the host computing system 110 is illustrated as a block diagram in FIG. 4. As shown in FIG. 4, the host computing system 110 includes at least one computing device 402, such as a personal computer (PC). The computing device 402 includes a processor 404, a memory 406, an I/O device 408 suitably interconnected via one or more buses 414. The I/O device 408 is connected to one or more input devices 410, such as a keyboard, touch pad, pointing device, etc., and a display 412. The memory 406 may include read only memory (ROM), random access memory (RAM), and storage memory. The storage memory and their associated computer-readable media provide non-volatile storage of computer readable instructions, data structures, program modules, and other data.

As illustrated in FIG. 4, the memory 406 stores an operating system 420 for controlling the operation of the computing device 402. In one embodiment, the operating system 420 provides a graphical operating environment, such as Microsoft Corporation's WINDOWS®, LINUX or Apple's Leopard graphical operating system in which activated application programs are represented as one or more graphical application windows with a display visible to the user. The memory 406 also stores a number of application programs, such as the control application 426 and the analysis application 428, for managing the collection and processing of GDT readings captured by utility meters.

In the embodiment depicted in FIG. 4, the memory 406 stores a control application 426 for managing the collection of GDT readings. Similar to the description above, when GDT readings are transmitted to the host computing system 110, the readings are identified as having an elevated status. In addition to allowing access to GDT readings, logic implemented by the control application 426 determines whether sufficient GDT readings for the relevant interval were obtained. Even though GDT readings are allocated priority, interference sources may exist that prevent GDT readings from being successfully received at the host computing system 110. If a determination is made that one or more GDT readings were not received during a reporting window, the control application 426 may generate a command that causes a utility meter to transmit a secondary GDT reading. One example routine 600 implemented by the control application 426 to obtain secondary GDT readings will be discussed in detail below with regard to FIG. 6.

In the embodiment depicted in FIG. 4, the memory 406 also stores an analysis application 428 for parsing and otherwise analyzing GDT readings. In particular, the analysis application 428 includes program logic that categorizes incoming GDT readings for communication/exporting to the appropriate entities and/or software systems. In one embodiment, the categorization performed by the analysis application 428 includes aggregating incoming GDT readings according to particular accounts/customers. In this way, the GDT readings can be made available to the appropriate entities. In addition, the analysis application 428 implements logic to "tune" the parameters in which utility meters transmit GDT readings. In particular, logic is implemented to measure the achieved level of performance in transmitting and collecting GDT readings. If the performance is below expectations, a set of parameters (e.g., transmission frequency, length of reporting window, etc.) that are best suited for transmitting GDT readings from a utility meter are identified. Based on the analysis, commands may be generated and transmitted from the host computing system 110 for the purpose of reprogramming the utility meters in accordance with the identified parameters.

Figure 5A:
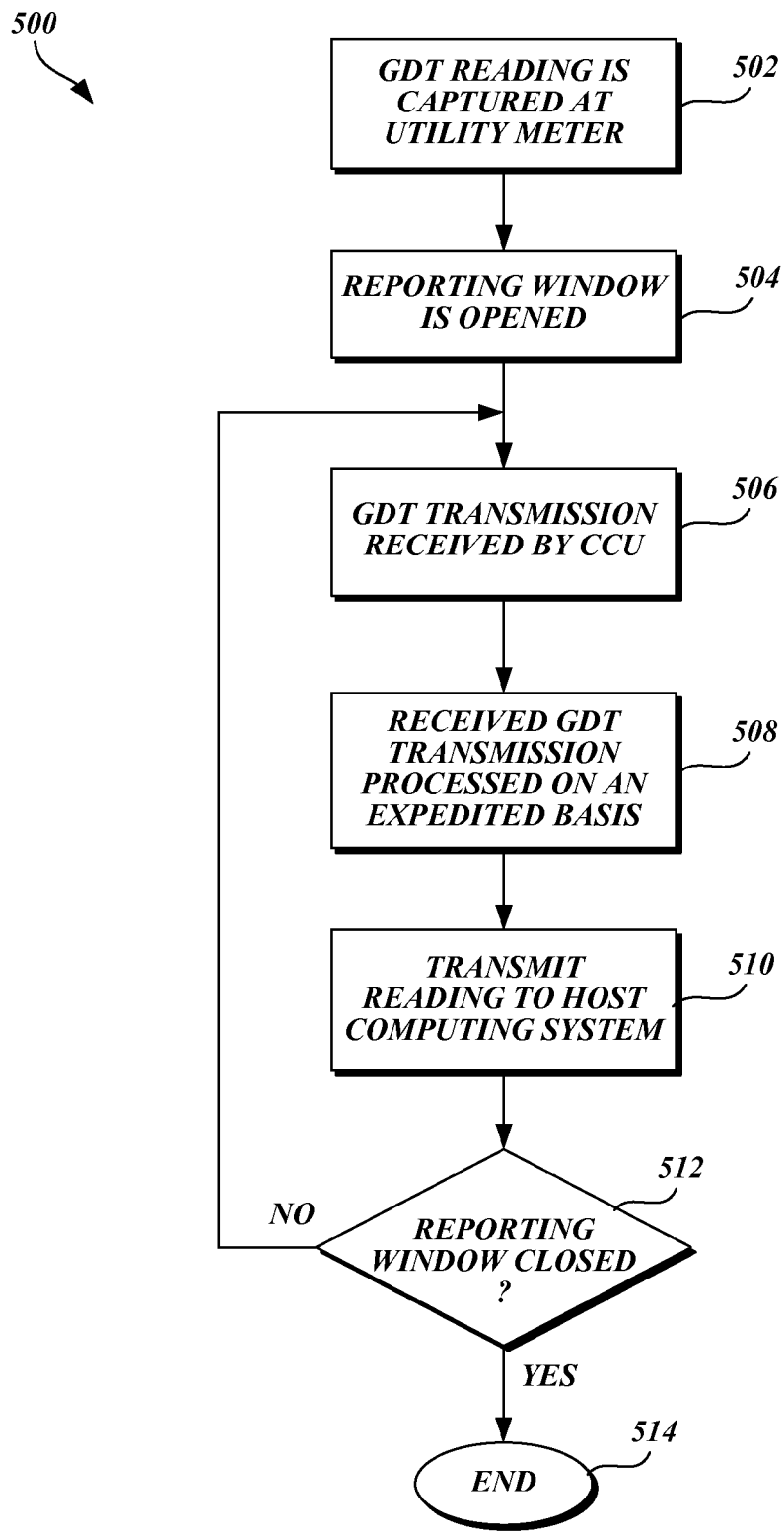
FIG. 5A is a flow diagram of one example routine for collecting GDT meter readings.

Now with reference to FIG. 5A, a routine 500 for transmitting and collecting GDT meter readings on a prioritized basis will be described. As illustrated in FIG. 5A, the routine 500 begins at block 502, where a time-synchronized GDT reading is captured at one or more utility meters. As mentioned previously, GDT readings may be taken periodically at a particular GDT interval (daily, weekly, monthly, etc.). Moreover, each utility meter takes their individual GDT readings at the same specified time (e.g., the "freeze" time). In this regard, the disclosed subject matter provides a utility meter that can be reprogrammed to modify the freeze time or the duration of the reporting window. By way of example only, a command may be generated at the host computing system 110 and communicated to a utility meter to modify these parameters from existing values. To facilitate time synchronized readings, each utility meter may include a clock that is synchronized, for example, to a known accurate time using Global Positioning Systems (GPS) or other network time synchronization systems.

At block 504, a window for reporting GDT readings from one or more utility meters is opened. Once the time synchronized GDT readings is captured, each utility meter may encode and begin transmitting packetized data that includes a GDT reading. During the reporting window, the GDT readings are transmitted from the utility meter at a higher frequency than other meter readings, thereby increasing the likelihood that the reading will be successfully collected at the host computing system 110. As mentioned previously, the time when the GDT readings are transmitted, the duration of the reporting window, and the frequency of transmissions are each configurable.

At block 506 of the routine 500, GDT transmissions from one or more utility meters are received by a CCU. Typically, a metering system is geographically arranged to ensure that each utility meter within a coverage area is able to transmit data to at least one CCU. Moreover, CCUs are configured to obtain radio-based meter readings, including GDT readings, from one or more utility meters. Accordingly, upon initiation of the reporting window (at block 504), CCUs within the metering system 100 begin receiving GDT transmissions. Upon receipt, a transmission containing a GDT reading is identified at the CCU as being of higher priority than other meter readings. As a result, the CCU causes the GDT readings to be processed and forwarded to a utility service provider on an expedited basis.

For illustrative purposes and by way of example only, a representative BUP packet suitable to illustrate aspects of the disclosed subject matter is depicted in FIG. 5B. In this regard, the packet 550 includes a plurality of rows ("fields") having entries organized within the BYTE 552, VALUE 554, and DESCRIPTION 556 columns. In this embodiment, the BYTE 552 column includes entries containing integers that identify the amount of data allocated to a particular field. The VALUE 554 column includes entries that identify a fixed or variable value for the data within the field. Moreover, the DESCRIPTION 556 column includes a string of characters that provides a human-readable description of the field. In accordance with one embodiment, the packet 550 includes fields for encapsulating GDT readings for transmission to a utility service provider.

As illustrated in FIG. 5B, the packet 550 includes a protocol ID field 558. As mentioned previously, the processing and routing of GDT readings is allocated priority throughout the metering system 100. In one embodiment, the protocol ID field 558 is configurable and may be set to identify the packet as containing a GDT reading. When decoding the packet 550, the CCU and host computing system identifies the value in the protocol ID field 558 and determines that the incoming data will be processed and forwarded on an expedited basis. While the packet 550 is depicted as having specific attributes and fields, those skilled in the art and others will recognize that these attributes may be varied without departing from the scope of the claimed subject matter.

With reference again to FIG. 5A, an incoming GDT transmission is processed by a collector on an expedited basis, at block 508. Meter readings that are not allocated priority are typically uploaded to the host computing system 110 on a set schedule (e.g., hourly). In one embodiment, GDT readings are processed for transmission to the host computing system 110 immediately upon receipt by a CCU. In an alternative embodiment, GDT readings are temporarily stored on the CCU and processed for transmission to the host computing system in relatively small or clustered data sets. In either instance, GDT readings are allocated an elevated status at the CCU for prioritized processing and routing. Then, at block 510 of the routine 500, a set of data corresponding to one or more GDT meter readings is transmitted to the host computing system 110. As mentioned previously, the GDT readings are forwarded, at block 510, on a prioritized basis that is either immediately upon receipt by the CCU or after a relatively small GDT data set has been aggregated.

As further illustrated in FIG. 5A, at decision block 512, a determination is made regarding whether the reporting window for transmitting GDT readings has closed. As mentioned previously, utility meters continually transmit a GDT reading (at an elevated frequency) throughout the reporting window. Accordingly, if a determination is made at block 512 that the reporting window has not closed, the routine 500 proceeds back to block 506 and blocks 506 through 512 repeat until the reporting window closes. Conversely, when the utility meters in the metering system identify the termination time of the reporting window, the transmission of GDT readings ceases and the routine 500 proceeds to block 514, where it terminates.

In addition to facilitating business decision-making, the collection of synchronized GDT readings across multiple utility meters allows problems/malfunctions with a utility distribution system to be identified. Within a particular geographic area, utility service providers typically maintain meters that quantify the volume of a utility service (i.e., gas/water) input into the utility distribution system. Conversely, district utility meters and meters located at homes/businesses measure the quantity of the utility service reportedly consumed. By performing a time synchronized GDT reading, the analysis application 426 at the host computing system 110 is able to determine whether leaks, tampering, or other problems/malfunctions in the utility distribution system exist. In particular, the aggregated volume of utility service input within a GDT interval is compared with the amount reportedly consumed across multiple utility meters. If discrepancies exist between the quantity input and the quantity consumed, corrective action may be taken. To facilitate implementation of these corrective actions, the analysis application 426 may implement highly granular processing of the time synchronized GDT readings. For example, the quantity of a utility service reported from a district utility meter can be compared to the total aggregated volume consumed at utility meters within the district. By performing a more granular analysis of individual districts in this way, the source of the problem/malfunction within the utility distribution system is more readily identified.

Now with reference to FIG. 6, a routine 600 for obtaining secondary GDT meter readings will be described. As mentioned previously, anomalously high failure rate in data transmission could prevent sufficient GDT readings from being received at the host computing system 110. Accordingly, aspects of the disclosed subject matter allow missing GDT readings to be obtained on demand. In this regard, one routine 600 configured to obtain these secondary GDT readings by identifying and causing the appropriate utility meters to be queried will be now be described.

Figure 6:
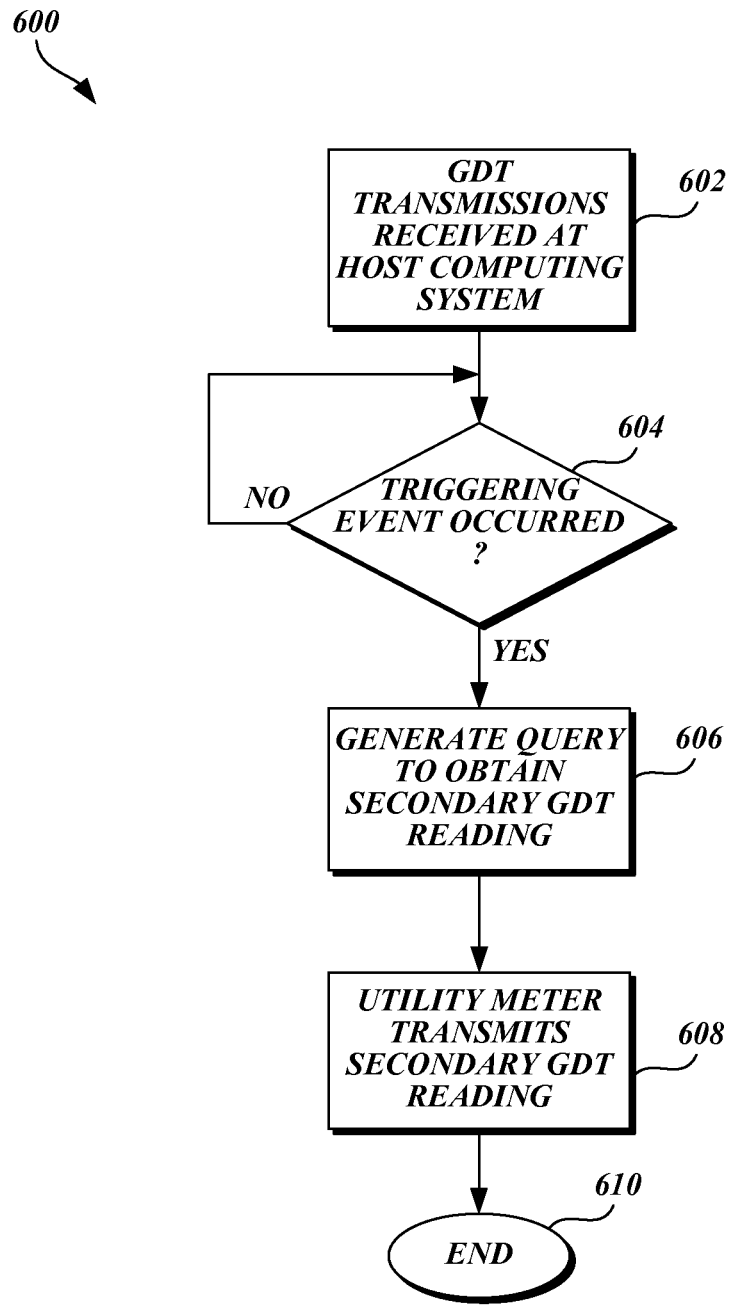
FIG. 6 is a flow diagram of one example routine for obtaining secondary GDT meter readings.

As illustrated in FIG. 6, the routine 600 begins at block 602 where GDT transmissions from the collection system 106 are received by the host computing system 110. As mentioned previously, the collection system 106 is configured to forward meter readings to the host computing system 110 over a wide area network 114. Similar to the description provided above, incoming GDT transmissions are identified at the host computing system 110 as being of higher priority than other meter readings and processed on an expedited basis. In one embodiment, this processing includes comparing the utility meters from which a GDT reading was received with a "target list." In this regard, a "target list" maintained at the host computing system 110 identifies the utility meters that need to provide a GDT reading. When GDT transmissions are received, processing is performed to update the target list and track those endpoints that have provided the GDT readings for the current reporting window.

At block 604, a determination is made regarding whether a triggering event occurred that will initiate the collection of a secondary GDT reading. As mentioned previously with reference to FIG. 6, utility meters are configured to automatically transmit GDT readings during a reporting window. As these initial transmissions are received, the target list maintained by the host computing system 110 is continually updated. If a GDT reading has not been successfully collected during a reporting window, a triggering event may occur that initiates the querying of one or more utility meters for a secondary GDT reading. In this regard, a margin of time is typically established between the termination of the reporting window and the GDT deadline when a complete set of GDT readings should be accessible from the host computing system 110. The triggering event can occur periodically during this margin of time. In this embodiment, the utility meter may be repeatedly queried until the GDT reading is successfully collected on the host computing system 110. In any event, if a determination is made that a triggering event has not occurred, the routine 600 remains idle until the identification of a triggering event. Conversely, if the determination is made that a triggering event occurred, then the routine 600 proceeds to block 606, described in further detail below.

At block 606 of the routine 600, a query to obtain a secondary GDT reading is generated. In particular, logic executed by the host computing system 110 identifies one or more utility meters in which a GDT reading has not been collected. As mentioned previously, the disclosed subject matter may be implemented in the context of a metering system in which utility meters are configured to not only report GDT readings during a reporting window but also accept and respond to two-way communications. In one embodiment, the host computing system 110 generates a query, at block 606, for transmission to one or more utility meters. Accordingly, intervening devices such as CCUs 116 and/or repeaters 118 may receive a transmission originating from the host computing system 110 for routing to the appropriate utility meters. Then, the two-way communication capabilities of one or more utility meters is utilized to transmit a secondary GDT reading, at block 608. Similar to the description provided above with reference to FIG. 5A, the secondary GDT reading is then routed back to the host computing system 110. Once all of the GDT readings have been collected, the routine 600 proceeds to block 610, where it terminates.

It should be well understood that the routines 500 and 600 described above with reference to FIGS. 5A-6 do not show all of the functions performed within the metering environment 100 depicted in FIG. 1. Instead, those skilled in the art and others will recognize that some functions and/or exchanges of data described above may be performed in a different order, omitted/added, or otherwise varied without departing from the scope of the claimed subject matter. For example, the routine 600 described with reference to FIG. 6 is illustrated as collecting one secondary GDT reading. However, in an actual embodiment, processing is performed repeatedly until each necessary GDT reading is successfully obtained. Accordingly, other queries may, and typically will, be generated and transmitted than those depicted in FIG. 6.

In addition to collecting GDT readings, processing is performed at the host computing system 110 to "tune" the parameters in which utility meters transmit GDT readings. Those skilled in the art and others will recognize that both temporary and permanent interference sources may exist that affect the transmission of data from a utility meter. For each GDT interval, the host computing system 110 may perform processing to measure the achieved level of performance in transmitting and collecting GDT readings. By way of example, if a failure occurs in collecting GDT readings within a deadline, processing may be performed at the host computing system 110 to improve reliability in collecting the readings. Since utility meters provided by the disclosed subject matter are capable of being reprogrammed, commands may be generated and transmitted to the utility meters in order to modify the parameters (i.e., frequency, length of reporting window, etc.) in which GDT readings are transmitted.

While embodiments of the claimed subject matter have been illustrated and described, it will be appreciated that various changes can be made therein without departing from the spirit and scope of the present disclosure.

The embodiments of the invention in which an exclusive property or privilege is claimed are defined as follows:

1. In a metering system that includes a utility meter and a collector configured to exchange data, a method of prioritizing the collection of GDT meter readings, the method comprising:
    at the utility meter, capturing a GDT meter reading that quantifies the consumption of a utility service;
    allocating with a data item the captured GDT meter reading an enhanced priority level relative to other transmissions from the meter;
    during a reporting window, transmitting a packet containing the GDT meter reading and the data item that identifies the enhanced priority level of the GDT meter reading transmission; and
    at the collector, receiving the transmission of the GDT meter reading, identifying the elevated priority allocated to the transmission, and causing the GDT meter reading to be forwarded from the collector to a host computer prior to the processing and transmission of other meter readings.

2. The method as recited in claim 1, further comprising determining whether the GDT meter reading was successfully received at the host computer during the reporting window and, if the GDT meter reading was not successfully received, causing the utility meter to transmit a secondary GDT meter reading.

3. The method as recited in claim 2, wherein determining whether the GDT meter reading was successfully received at the host computer includes maintaining a list that identifies each utility meter in which at least one GDT meter reading has been received during the reporting window.

4. The method as recited in claim 1, further comprising:
    identifying a set of parameters for transmitting GDT meter readings from the utility meter to improve the rate in which the GDT meter readings are collected by the host computer; and
    reprogram the utility meter to transmit GDT meter readings in accordance with the identified parameters.

5. The method as recited in claim 4, wherein the set of parameters reprogrammed at the utility meter include at least one parameter from the group consisting of increasing the frequency of transmission, extending the duration of the reporting window, and modifying the time when the reporting window is opened.

6. The method as recited in claim 1, wherein capturing a GDT meter reading that quantifies the consumption of a utility service includes synchronizing the time maintained by the utility meter with a time maintained by a remote device and wherein the time when the GDT meter reading is captured occurs at the same time across a plurality of utility meters.

7. The method as recited in claim 1, wherein transmitting a packet of the GDT meter reading includes encoding the GDT meter reading into an encapsulated format that is suitable for transmission over a wireless network.

8. The method as recited in claim 1, wherein the packet containing the GDT meter reading is repeatedly transmitted during the reporting window at a rate that is higher than the rate of transmission for meter readings allocated a lower priority.

9. A utility meter configured to report GDT meter readings, comprising:
    a processor;
    a clock for maintaining a current time;
    a radio-based communication device for communicating data between the utility meter and a remote device;
    a computer-readable media having computer-executable instructions that, when executed by the processor, cause the utility meter to:
        capture a GDT meter reading that quantifies the consumption of a utility service over a GDT interval, wherein to capture the GDT meter reading includes using the clock to synchronize the GDT meter reading with a meter reading performed on at least one remote utility meter;
        allocate the encoded GDT meter reading an enhanced priority level relative to other transmissions from the meter;
        encode the GDT meter reading into a format that is suitable for network transmission using the radio-based communication device; and
        during a reporting window, periodically transmit the encoded GDT meter reading at a rate that is more frequent than transmissions allocated a lower priority level.

10. The utility meter as recited in claim 9, wherein the utility meter is configured to modify the rate at which the GDT meter reading is transmitted during the reporting window.

11. The utility meter as recited in claim 9, wherein the utility meter is configured to modify the duration of the reporting window in which GDT meter readings are transmitted.

12. The utility meter as recited in claim 9, wherein the utility meter is configured to modify the time when GDT meter readings that quantify the consumption of a utility service are captured.

13. The utility meter as recited in claim 9, wherein the utility meter is configured to transmit a secondary GDT meter reading that quantifies the consumption of a utility service over the GDT interval in response to receiving a command from a remote device.

14. A metering system for collecting GDT meter readings, comprising:
    at least one utility meter configured to capture a GDT meter reading that quantifies the consumption of a utility service over a GDT interval;
    the said at least one utility meter also configured to allocate the captured GDT meter reading an enhanced priority level relative to other transmissions from the meter;
    a collector configured to receive a GDT meter reading transmitted by the utility meter, identify the enhanced priority level allocated to the transmission, and process the GDT meter reading for subsequent routing to a host computer in accordance with the identified enhanced priority level; and
    a host computer operative to track whether a GDT meter reading originating from the utility meter was successfully collected, and if a GDT meter reading originating from the utility meter was not successfully collected, generate and transmit a query via the collector that causes the utility meter to transmit a secondary GDT meter reading.

15. The metering system as recited in claim 14, further comprising at least one distribution utility meter configured to capture a distribution meter reading that quantifies the amount of a utility service input into a utility distribution infrastructure and wherein the host computer is further configured to determine whether discrepancies exist between the amount of utility service input into the utility distribution infrastructure and the amount reported in a set of GDT meter readings.

16. The metering system as recited in claim 14, wherein the collector is configured to forward the GDT meter reading to the host computer upon receipt without aggregating GDT meter readings received from a plurality of utility meters.

17. The metering system as recited in claim 14, wherein the collector is configured to aggregate GDT meter readings received from a plurality of utility meters before routing the aggregated data to the host computer.

18. The metering system as recited in claim 14, wherein the host computer is further configured to: determine whether the success rate for collecting meter readings during a GDT interval is below a defined threshold; if the success rate is below the defined threshold, identify a set of parameters for transmitting the GDT meter reading from a utility meter that improves the probability of collecting the transmissions at the host computer; and generate and transmit a command that reprograms the utility meter to transmit GDT meter readings in accordance with the identified parameters.

19. The metering system as recited in claim 18, wherein the set of parameters reprogrammed at the utility meter include at least one parameter from the group consisting of increasing the frequency of transmission, extending the duration of the reporting window, and modifying the time when the reporting window is opened.

20. The metering system as recited in claim 14, wherein the host computer is further configured to identify the enhanced priority level allocated to a received GDT meter reading and process the GDT meter readings at a higher priority relative to other meter readings.

* * * * *